March 23, 1948.    D. R. BABBITT    2,438,107
PIPE COUPLING
Filed June 6, 1946
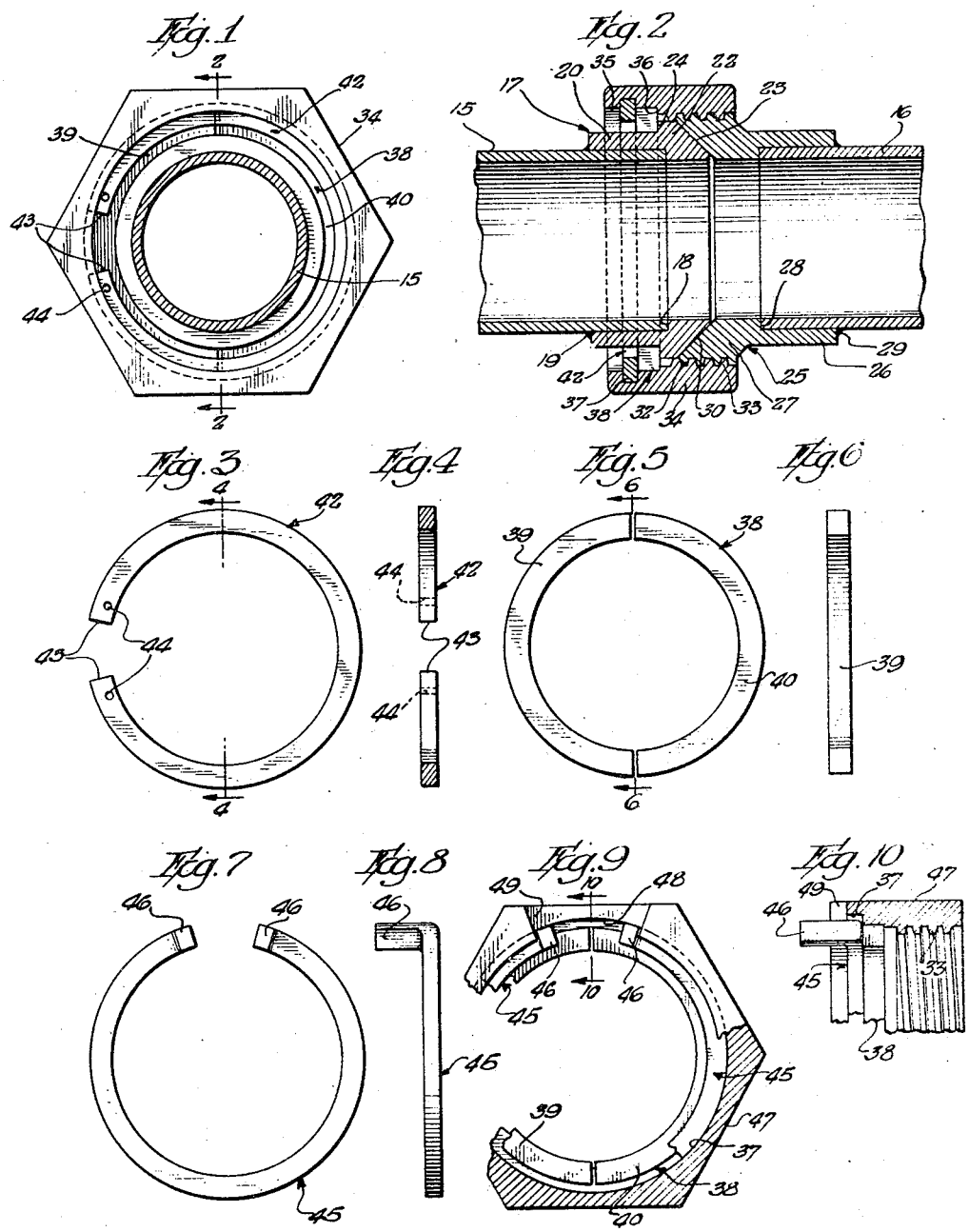

Patented Mar. 23, 1948

2,438,107

UNITED STATES PATENT OFFICE 2,438,107

PIPE COUPLING

Daniel R. Babbitt, Portland, Oreg., assignor to Electric Steel Foundry, Portland, Oreg., a corporation of Oregon Application June 6, 1946, Serial No. 674,787

5 Claims. (Cl. 285—122)

1

This invention relates to pipe couplings and more particularly to those of a class which are easily separable and embody removable parts to facilitate cleaning and changes of piping.

A general object of my invention is to provide a pipe coupling wherein the holding element is removable without disturbing other joints in the piping system in which it is used.

The invention has for another object the provision of an improved pipe coupling including a holding nut which is easily removable at the joint which is normally held thereby.

As another object my invention comprehends the provision of an improved pipe coupling adapted to use in sanitary tube lines and the like where frequent separation is necessary for cleaning.

Other objects and advantages of the invention will be apparent from the following description and the accompanying drawings in which similar characters of reference indicate similar parts throughout the several views.

Referring to the drawings of which there is one sheet:

Fig. 1 is an end elevational view of an assembly of a pipe coupling embodying a preferred form of my present invention;

Fig. 2 is a side sectional view with the section taken substantially on a line 2—2 of Fig. 1;

Figs. 3 and 4 are respectively plan and side sectional views of one part of the assembly shown in Figs. 1 and 2 wherein the section of Fig. 4 is taken substantially on a line 4—4 of Fig. 3;

Fig. 5 is a plan view of another part of the assembly shown in Figs. 1 and 2;

Fig. 6 is a side view of a portion of the parts shown in Fig. 5 when viewed substantially as indicated by the line 6—6 and accompanying arrows in Fig. 5;

Figs. 7 and 8 are respectively plan and side elevational views of a modified part corresponding to the part shown in Figs. 3 and 4 and adapted to the assembly depicted in Fig. 9;

Fig. 9 is a fragmentary end elevational view of an assembly embodying a modification of my invention; and Fig. 10 is a fragmentary side sectional view of a portion of the assembly shown in Fig. 9 and wherein the section is taken substantially on a line 10—10 of Fig. 9.

In the exemplary embodiment of my invention which is disclosed in the accompanying drawings, I have illustrated my preferred form of pipe coupling assembly in its adaptation to the releasable connection of the ends of two pieces of pipe which are indicated fragmentarily at 15 and 16. It is understood, of course, that the dis-

2 closed coupling might well be utilized for joining pipes of different sizes or in association with other pipe fittings or the like.

Referring to the assemblies depicted in Figs. 1 and 2, the end of the pipe 15 extends into one end of a flanged fitting 17 and desirably abuts a shoulder 18 in the flanged fitting definitely to locate the fitting on the end of the pipe. In order to ensure a fluid-tight seal between the pipe 15 and the flanged fitting 17 and to secure the fitting to the end of the pipe, they may be welded or soldered together on the outer surface of the pipe and at the adjacent end of the flanged fitting as indicated at 19.

In its preferred form, the flanged fitting 17 includes a collar portion 20 which surrounds the end portion of the pipe to which it is secured and an enlarged end portion 22 which projects beyond the end of the pipe and presents a tapered seat 23. On its outer surface a radial shoulder 24 is provided intermediate the collar portion 20 and enlarged end portion 22 which shoulder faces away from the tapered seat 23.

On the end of the pipe 16 is a second flanged fitting 25 including a collar portion 26 and an enlarged end portion 27. The end of the pipe fits into the collar portion 26 and desirably abuts an internal shoulder 28. As in the instance of the flanged fitting 17, the flanged fitting 25 is secured and sealed to the pipe 16 by welding or soldering at their adjoining outer surfaces as indicated at 29.

The end of the flanged fitting 25 facing away from the pipe 16 is provided with a tapered surface 30 complementary to and adapted to seat with the tapered surface 23 on the fitting 17 to form a fluid-tight seal between the fittings when they are drawn tightly together. On the outer surface adjacent the tapered surface 30, the enlarged end portion of the flanged fitting 25 is provided with threads 32, which threads fit and coact with internal threads 33 of a nut 34.

In order that the nut may be moved longitudinally of the pipes 15 and 16 and may be removed therefrom through the opening between the unjoined ends of the flanged fittings 17 and 25, the minor diameter of the nut threads 33 is sufficiently large to pass over the enlarged end and other portions of the flanged fitting 17. Furthermore, removable parts are provided in the nut 34 which coact with the flanged fitting 17 to draw that fitting toward the flanged fitting 25 when the nut is drawn toward the fitting 25 by the action of the threads.

In the disclosed embodiment of my invention, one end portion of the nut 34 is threaded and the other end portion 35 has an internal diameter substantially greater than the major diameter of the threads 33. A radial shoulder 36 on the internal surface of the nut is intermediate the threaded end portion and the end portion 35 and faces away from the threads 33. Axially spaced from the shoulder 36, the end portion 35 of the nut has therein an internal annular groove 37.

A split ring 38 such as that illustrated in Figs. 5 and 6 may be composed of two or more arcuate sections which together form a substantially complete annular ring. In the present instance, two substantially semi-circular sections 39 and 40 are utilized. The outer diameter of the split ring 38 is such that it fits endwise into the end portion 35 of the nut and abuts the shoulder 36. The length of the split ring is such that it fits between the shoulder 36 of the nut and the nearer edge of the annular groove 37. The split ring has a thickness and internal diameter such that it fits over the collar portion 20 of the flanged fitting 17 and extends inwardly of the nut to a position such that it is adapted to abut the shoulder 24 on the flanged fitting.

In order to hold the split ring 38 in assembled relationship relative to the nut 34 during use, a substantially C-shaped resilient snap ring 42 of the type shown in Figs. 3 and 4 is utilized. The snap ring 42 has ends 43 spaced apart a distance sufficient to permit the deformation of the snap ring to an extent permitting its insertion into the end portion 35 of the nut. The normal diameter and outer dimensions of the snap ring 42 are such that it fits into and firmly engages the annular groove 37 in the nut to hold it in place. The internal diameter of the snap ring is such that it extends inwardly of the nut and overlaps the end surface of the split ring 38 opposite the shoulder 36. The snap ring 42 thus retains the sections of the split ring 38 in place between one of its end surfaces and the shoulder 36 and serves as a backing element for the split ring sections when the nut is tightened to draw the inner surface of the split ring against the shoulder 24 of the flanged fitting 17. In order to facilitate removal of the snap ring when the nut is loosened, bores 44 are provided near the spaced ends 43 to accommodate a suitable gripping tool adapted to be utilized in effecting sufficient deformation of the resilient snap ring for its removal from the groove 37.

The internal and external diameters of the snap ring 42 are so proportioned with respect to the depth of the groove 36, the internal diameter of the end portion 35 of the nut and the diameter of the pipe 15, that when the nut is loosened so that the split ring 38 is backed away from the shoulder 24 of the flanged fitting 17, there is sufficient space inside the snap ring to permit its distortion by squeezing the ends 43 together to permit its removal from the groove 37 and its withdrawal from the end of the nut. Since this may be done while the nut surrounds the pipe and since the sections of the split ring may then be withdrawn from the nut and from around the pipe, those retaining elements, when removed, no longer restrain the movement of the flanged fitting 17 through the interior of the nut. It is general in piping that the ends of joined pipes can be sprung apart to a certain extent when disconnected. Consequently, and since the minor diameter of the nut threads 33 is sufficiently large to pass over the enlarged end portion 22 of the flanged fitting, the nut may be entirely removed from the pipe for replacement or cleaning purposes without necessitating the disconnection or separation of any other joint or joints of the piping system.

In the modification of my invention depicted in Figs. 7 to 10, inclusive, the nut and retaining parts are adapted to function with flanged fittings of the exemplary form disclosed in Figs. 1 and 2 and the general structure of the nut and split ring are similar to those parts of the previously described form. To avoid the repetition of descriptive matter, reference numerals in Figs. 7 to 10, inclusive, which are similar to those used in Figs. 1 to 6, inclusive, refer to like parts.

In the modified form of Figs. 7 to 10, inclusive, a snap ring 45 is representative of one of a wide variety of variations which may be made in the structure of this part of my coupling. Instead of using the bores 44 for the accommodation of a suitable tool for distorting the snap ring during its insertion and removal, the snap ring of Figs. 7 and 8 has end portions 46 which are disposed substantially at right angles to the plane of the ring and project outwardly therefrom. These end portions may be gripped by any suitable tool, such as a pair of pliers, for distorting the ring during its insertion or removal.

To provide for the accommodation of the projecting end portions of the snap ring and to permit their movement relative to the nut 47, that nut has an internal recess 48 of sufficient width to permit the full expansion of the snap ring into the groove 37 and a depth axially of the nut which extends from the end thereof into the groove 37. In order to allow for the movement of the end portions 46 toward and from one another and to facilitate the gripping of the projecting ends 46, the end surface of the nut is desirably recessed at 49 to a depth adjoining the groove 37. The recesses 48 and 49 are coextensive circumferentially of the nut.

In both of the disclosed forms of my pipe coupling, the principles of operation and the steps for effecting disassembly and removal or placement and assembly of the removable nut are similar.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A pipe coupling for separably joining the ends of two pipes and comprising, in combination, coacting flanged fittings adapted to be secured to said ends of the two pipes by fluid-tight joints and having tapered end surfaces for separably seating together in fluid-tight relationship, one of said flanged fittings having a threaded outer surface of a diameter greater than that of the pipe to which it is secured, the other of said flanged fittings having an enlarged end portion of a diameter substantially equal to the minor diameter of said threads and a collar portion of lesser diameter than the enlarged end portion joined by a shoulder surface facing away from said one of the flanged fittings, a nut having an end portion internally threaded to fit the threaded outer surface of said one of the fittings, the entire other end portion of said nut having an internal diameter greater than the major diameter of the threads and having therein an annular groove separated from the threaded end portion by a shouldered intermediate portion, a split ring including two semicircular halves of a size to fit said collar portion in a position abutting said shoulder surface and to fit within said shouldered intermediate portion of the nut between the threaded portion and said annular groove, and a snap ring having normally separated ends and of a size to fit into said annular groove with an edge portion abutting the ends of the halves of said split ring to retain the split ring in place within the nut, said snap ring having an internal diameter sufficiently greater than one of the pipes that the separated ends thereof may be forced together to effect removal of the snap ring and split ring.

2. A pipe coupling for separably joining the ends of two pipes or the like and comprising, in combination, a nut having an internally threaded portion at one end and a portion at the other end having an internal diameter larger throughout its length than the major diameter of the threads with a shoulder intermediate said portions, the latter mentioned portion having an annular groove therein spaced from said shoulder, a pair of flanged fittings adapted to be secured to the ends of the pipes and presenting opposed end surfaces for separably seating together, one of said flanged fittings having an enlarged end portion of a diameter such that it will pass through the threaded portion of said nut and having a shoulder facing away from said end surface of the fitting, a split ring having arcuate sections which together form a substantially complete ring, said split ring being of a size to fit within said other end of the nut between said shoulder and said groove, said split ring having an internal diameter such that it projects inwardly of the nut sufficiently to engage the shoulder on said one of the flanged fittings, a snap ring fitting into said annular groove and projecting radially therefrom to overlap an end of said split ring, thereby removably to confine the split ring between said shoulder in the nut and the snap ring, the other of said flanged fittings being threaded to fit the threaded portion of the nut so that said opposed end surfaces of the fittings are drawn together between the split ring and the threads of the nut.

3. In a coupling for separately joining the ends of two pipes or the like, the combination comprising a nut having an internally threaded portion at one end and a portion at the other end having an internal diameter which throughout the length thereof is larger than the major diameter of the threads with a shoulder intermediate said portions, the latter mentioned portion having an annular groove therein spaced from said shoulder, a flanged fitting adapted to be secured to the end of a pipe and including a collar portion at one end and an enlarged portion at the other end, said portions of the fitting being joined on the outer surface by a shoulder facing away from the enlarged end portion, a split ring having arcuate sections which together form a substantially complete ring, said split ring having external and internal diameters to fit within said other end of the nut and around said collar portion of the fitting respectively, the width of said split ring being such that it fits between said shoulder in the nut and said annular groove, a snap ring having external dimensions such that it fits firmly into said annular groove, and the internal diameter of the snap ring being such that it encircles said collar portion of the fitting and projects inwardly of the nut to overlap the end of the split ring opposite the shoulder of said fitting.

4. In a coupling for separably joining the ends of two pipes or the like, the combination comprising a nut having an internally threaded portion at one end and a portion at the other end having an internal diameter which is larger throughout the length thereof than the major diameter of the threads of said threaded portion, said portions being joined by an internal shoulder facing away from the threaded portion, said portion at the other end having an annular groove therein spaced from said internal shoulder, a split ring having arcuate sections which together form a substantially complete ring, said split ring having external and internal diameters to fit within said other end of the nut and to extend inwardly of the nut beyond the minor diameter of the threads of said threaded portion, the width of said split ring being such that it fits between said shoulder in the nut and said annular groove, a snap ring having external dimensions such that it fits firmly into said annular groove, and the internal diameter of the snap ring being such that it projects inwardly of the nut to overlap the end of the split ring opposite said shoulder in the nut.

5. In a coupling for separably joining the ends of two pipes or the like, the combination comprising a nut having an internally threaded portion at one end and a portion at the other end having an internal diameter which is larger throughout its length than the major diameter of the threads of said threaded portion, said portions being joined by an internal shoulder facing away from the threaded portion, said portion at the other end having an annular groove therein spaced from said internal shoulder, a split ring having arcuate sections which together form a substantially complete ring, said split ring having external and internal diameters to fit within said other end of the nut and to extend inwardly of the nut beyond the minor diameter of the threads of said threaded portion, the width of said split ring being such that it fits between said shoulder in the nut and said annular groove, a snap ring having external dimensions such that it fits firmly into said annular groove, and the internal diameter of the snap ring being such that it projects inwardly of the nut to overlap the end of the split ring opposite said shoulder in the nut, said snap ring having ends spaced apart and projecting in a direction transverse to the plane of the snap ring, and said nut having a recessed portion extending endwise thereof from said annular groove to accommodate said ends of the ring when it is in place in the groove.

DANIEL R. BABBITT.

REFERENCES CITED

The following references are of record in the file of this patent:

UNITED STATES PATENTS

| Number | Name | Date |
|---|---|---|
| 1,016,620 | Gapp | Feb. 6, 1912 |